(12) United States Patent
McNeil

(10) Patent No.: US 11,359,860 B2
(45) Date of Patent: Jun. 14, 2022

(54) HERB ESSENTIAL OIL PROCESSING EQUIPMENT

(71) Applicant: Michael B. McNeil, Bloomington, IN (US)

(72) Inventor: Michael B. McNeil, Bloomington, IN (US)

( * ) Notice: Subject to any disclaimer, the term of this patent is extended or adjusted under 35 U.S.C. 154(b) by 455 days.

(21) Appl. No.: 16/562,803

(22) Filed: Sep. 6, 2019

(65) Prior Publication Data

US 2020/0080777 A1 Mar. 12, 2020

Related U.S. Application Data

(60) Provisional application No. 62/765,592, filed on Sep. 10, 2018.

(51) Int. Cl.
| | | |
|---|---|---|
| *F26B 5/06* | (2006.01) | |
| *C11B 1/10* | (2006.01) | |
| *B01D 11/02* | (2006.01) | |

(52) U.S. Cl.
CPC ............... *F26B 5/06* (2013.01); *B01D 11/02* (2013.01); *C11B 1/10* (2013.01)

(58) Field of Classification Search
CPC .............. F26B 5/06; B01D 11/02; C11B 1/10
USPC ........................................................ 34/287
See application file for complete search history.

(56) References Cited

U.S. PATENT DOCUMENTS

| | | | | | |
|---|---|---|---|---|---|
| 2,152,665 | A | * | 4/1939 | Rosenthal | B01D 11/0242 554/16 |
| 3,118,742 | A | * | 1/1964 | James | F26B 5/06 34/92 |
| 4,104,805 | A | * | 8/1978 | Margittai | F26B 5/06 34/287 |
| 5,171,229 | A | * | 12/1992 | McNeil | A61M 5/3216 604/110 |
| 10,443,935 | B2 | * | 10/2019 | Knight | F26B 25/063 |
| 10,478,747 | B2 | * | 11/2019 | Ko | B01D 15/00 |
| 10,809,002 | B2 | * | 10/2020 | Schuetz | F26B 5/06 |
| 10,809,003 | B2 | * | 10/2020 | De Beer | F26B 5/06 |
| 11,035,613 | B2 | * | 6/2021 | Knight | A01N 1/0289 |
| 2020/0080777 | A1 | * | 3/2020 | McNeil | B01D 11/0296 |

FOREIGN PATENT DOCUMENTS

| | | | | | |
|---|---|---|---|---|---|
| GB | | 737955 A | * | 10/1955 | ............ C11B 1/108 |
| WO | WO-2010098853 A1 | | * | 9/2010 | ............ A01K 47/06 |

* cited by examiner

*Primary Examiner* — Stephen M Gravini

(57) ABSTRACT

A plant oil extractor includes a food grade tray with a removable lid that together define an evaporation chamber. A gaseous fluid pump has an inlet fluidly connected to the evaporation chamber and an outlet fluidly connected to an area outside of the evaporation chamber, which may be positioned in a freezer to recover condensed solvent leaving previously dissolved plant essential oil on the food grade tray. A vacuum sublimation freeze drying apparatus includes a container, which defines a drying chamber, is positioned in a freezer. A gaseous fluid pump has an inlet fluidly connected to the drying chamber and an outlet that opens outside the container. Water in fresh herbs positioned in the drying chamber initially freezes and then sublimates leaving behind freeze dried herbs.

20 Claims, 4 Drawing Sheets

HERB ESSENTIAL OIL PROCESSING EQUIPMENT

TECHNICAL FIELD

The present disclosure relates generally to plant essential oil processing equipment for home use, and more particularly to a plant oil extractor that separates dissolved essential oil from a solvent in one arrangement, or performs as a vacuum sublimation freeze drying apparatus in a different arrangement with a freezer.

BACKGROUND

Herb essential oils have long been used for medicinal, therapeutic, recreational, culinary and other uses. Most if not all fresh herbs are composed of solid plant material, water and essential oils, with these three constituents typically varying in concentration throughout a plant, and changing during the plant's life cycle. Depending upon the herb of interest, different processing techniques, or none at all, may be necessary for a preferred use. For instance, basil may find its best use with no processing by simply cutting the fresh herb, and utilizing the fresh cutting in a culinary dish. Most of the attractive aspects of basil can be lost by processing, such as drying. Hemp essential oil can be processed in a variety of different ways for different applications. Hemp may be processed initially by drying to leave behind plant material with its essential oil. The dry herb may be smoked directly by an end user, or further processing may take place to dissolve the essential oil in a solvent, such as ethanol to separate the essential oil from the plant material through a filtration process. Thereafter, the essential oil may be isolated from the solvent through an evaporation process. Depending upon the processes used, and the equipment available, it may be difficult for home herb enthusiast to effectively process their fresh or dried herbs effectively, or without damaging or destroying desirable aspects of the herb during a drying or extraction process.

The present disclosure is directed to one or more of the problems set forth above.

SUMMARY

In one aspect, a plant oil extractor includes a food grade tray with a perimeter wall separating a base surface from a rim. A removable lid has a rim contact surface shaped and sized to mate with the rim of the food grade tray. The tray and lid define an evaporation chamber when the lid is mated with the tray, and at least one of the tray and the lid include a transparent window positioned to allow the base surface to be seen from outside of the evaporation chamber. An electric gaseous fluid pump has an inlet fluidly connected to the evaporation chamber and an outlet fluidly connected to an area outside of the evaporation chamber. The extractor has a first configuration in which the pump is off and the lid is out of contact with the tray, and a second configuration in which the rim contact surface of the lid is mated to the rim of the tray, the pump is on, and a pressure inside the evaporation chamber is lower than a pressure outside of the evaporation chamber. The extractor also has a third configuration in which the lid is mated to the tray, and both the tray and lid are tilted together.

In another aspect, a method of operating a plant oil extractor includes positioning a solvent with dissolved plant essential oil onto a food grade tray. A lid is attached to the food grade tray to define an evaporation chamber, so that the solvent and dissolved plant oil are visible through a window that is part of one of the food grade tray and the lid. Evaporated solvent is moved out of the evaporation chamber with an electric gaseous fluid pump, which reduces pressure in the evaporation chamber to below an ambient pressure outside of the evaporation chamber. The evaporated solvent is moved into one end of food grade tubing fluidly connected to an outlet of the gaseous fluid pump. The evaporated solvent is condensed back to a liquid responsive to positioning an opposite end of the food grade tubing in a freezer.

In another aspect, a vacuum sublimation freeze drying apparatus includes a freezer and a container that defines a drying chamber. The container includes a first component movable with respect to a second component between an open configuration and a closed configuration. An electric gaseous fluid pump has an inlet fluidly connected to the drying chamber, and an outlet that opens to an area outside of the container. A desiccant is positioned in the drying chamber and oriented to define an air circulation pattern within the drying chamber. With an exception of the electric gaseous fluid pump, the drying chamber is a closed volume in the closed configuration. The freeze drying apparatus has a first configuration characterized by the container being out of contact with the freezer in an open configuration, and the electric gaseous fluid pump is turned off. The freeze drying apparatus has a second configuration characterized by the container being positioned inside, and in contact with, the freezer in the closed configuration, with the electric gaseous fluid pump turned on.

DETAILED DESCRIPTION

Figure 1:
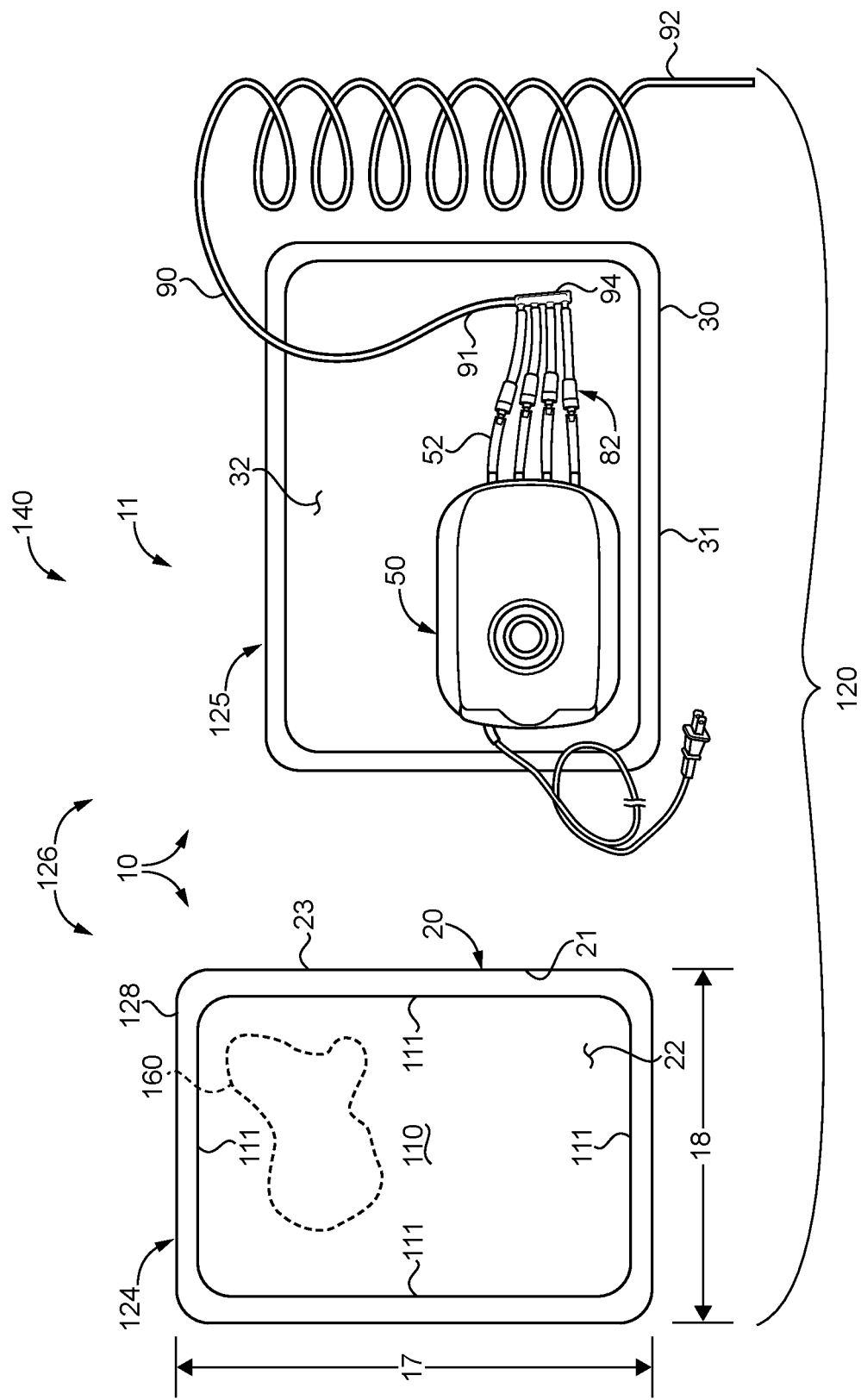
FIG. 1 is a top view of an herb essential oil processing apparatus according to the present disclosure in an open configuration.
Figure 2:
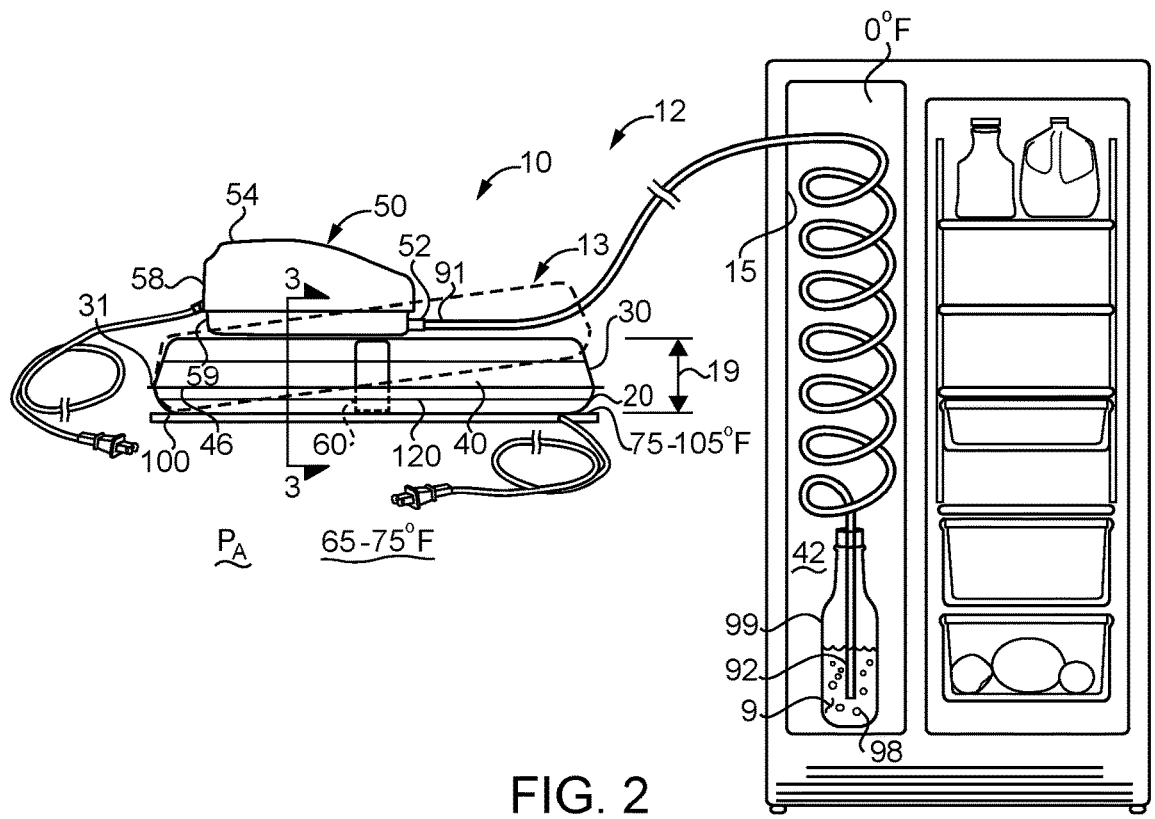
FIG. 2 is a side schematic view of the apparatus of FIG. 1 configured as a plant oil extractor in a closed configuration in conjunction with a home freezer.
Figure 3:
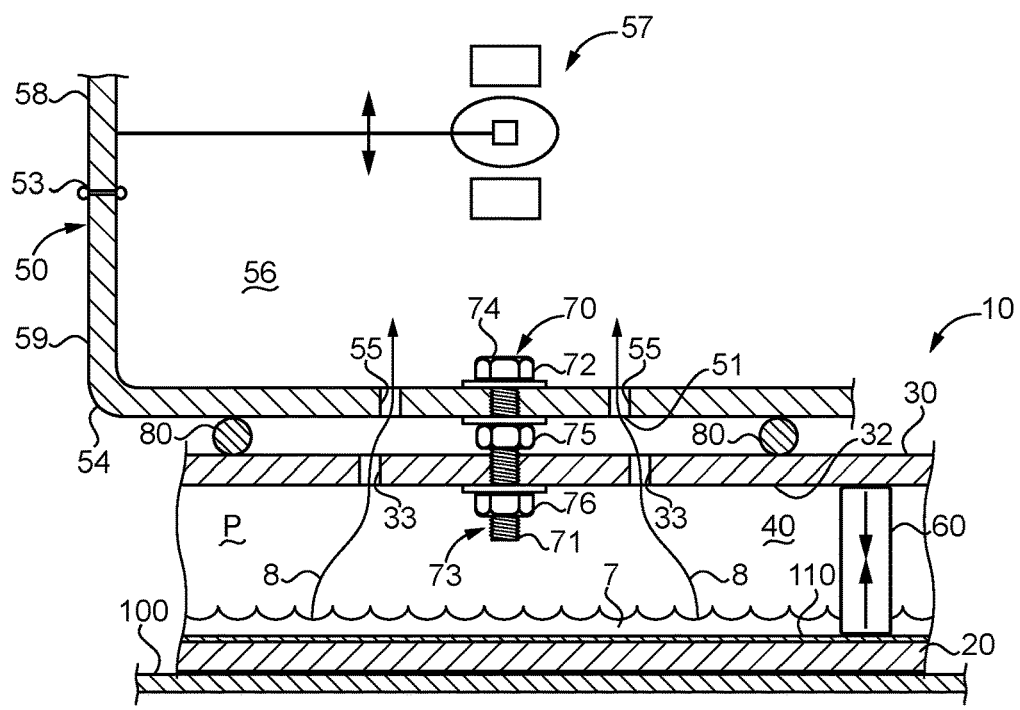
FIG. 3 is a partial sectioned side view of the apparatus of FIG. 2 as viewed along section lines 3-3.

Referring initially to FIGS. 1-3, a plant essential oil extractor 10 includes a food grade tray 20 with a perimeter wall 21 separating a base surface 22 from a rim 23. Those skilled in the art will appreciate that food grade tray 20 could be an aluminum baking sheet, a rectangular glass cake pan or any other food grade open receptacle with a smooth bottom for containing a fluid. A removable lid 30 has a rim contact surface 31 shaped and sized to mate with the rim 23. Thus, lid 30 could be an appropriate transparent plastic lid for a baking sheet, or maybe a flexible opaque lid associated with a glass cake pan, mentioning only two possible examples. The tray 20 and the lid 30 define an evaporation chamber 40 when the lid 30 is mated to the tray 20. At least one of the tray 20 and the lid 30 include a transparent window 34 positioned to allow the base surface 22 to be seen from outside 41 of the evaporation chamber 40. This aspect allows a user to monitor an extraction process in real time or otherwise observe material within the evaporation chamber 40 without unsealing the tray 20 from lid 30.

An electric gaseous fluid pump 50 has an inlet 51 fluidly connected to the evaporation chamber 40, and an outlet 52 fluidly connected to an area 42 outside of the evaporation chamber 40. In this example embodiment, pump 50 is illustrated as an aquarium air pump with four outlets 52 that pass through individual check valves 82 before merging at a manifold 94. The outlet of manifold 94 may be fluidly connected to one end 91 of an elongate segment of food grade tubing 90. Depending upon the flow rate from pump 50, the length of tube 90 ought to be sufficient to condense all or at least a majority of solvent vapor pushed into tube 90 when the tube is positioned in a freezer 15, which is set at a conventional freezer temperature such as about 0° F. Thus, in this example, food grade tubing 90 is at least 15 feet long. Those skilled in the art will also appreciate that the diameter of the food grade tubing 90 also plays a part in how long the tubing needs to be in order to condense a majority of solvent vapor back to liquid when the tube is positioned in a freezer 15 or in another cold space. Thus, a colder freezer could require a shorter tube. Tubing 90 may be pinched between a freezer door and freezer body.

Plant essential oil extractor 10 is shown in FIG. 1 in a first configuration 11 which is characterized by the pump 50 being off and the lid 30 being out of contact with the tray 20. FIG. 2 shows the plant essential oil extractor 10 in a second configuration 12 in which the rim contact surface 21 of the lid 30 is mated to the rim 23 of the tray 20. The pump 50 is on, and a pressure inside the evaporation chamber 40 is lower than ambient pressure $P_A$ outside of the evaporation chamber 40. Depending upon how well the lid 30 mates to tray 20, one might also desire to include a food grade seal 46 in contact with tray 20 and lid 30. For instance, a seam of food grade silicone sealant might be positioned on rim 23 prior to mating lid 30 to tray 20, and/or the food grade seal 46 might be accomplished by wrapping the extractor 10 with conventional kitchen cling wrap. Nevertheless, the device will still function even if some air leakage occurs from outside the extractor 10 into evaporation chamber 40. FIG. 3 also shows extractor 10 in dotted lines in a third configuration in which the lid 30 is mated to the tray 20, and both the tray 20 and lid 30 are tilted together. This aspect allows a user to observe liquid sloshing within evaporation chamber 40 without the necessity of opening extractor 10 and breaking any seal which may otherwise need to be reestablished to monitor operation of the device.

Depending upon factors including an area of base surface 22 of tray 20 and/or a rigidity of lid 20, extractor 10 may include a lid support 60 that is compressed between the base surface 22 and an inside surface 32 of the lid 30 when the extractor 10 is in the second configuration. Thus, lid support 60 may prevent lid 30 and/or tray 20 from deforming too significantly when pump 50 creates a vacuum within evaporation chamber 40. Lid support 60 can be any suitable component that preferably has a small contact surface with base surface 22 in order to limit its interaction with any liquid 7 contained therein, but still capable of supporting a substantial column load. For instance, a short segment of PVC tubing or possibly even a pizza box center support can adequately function as a lid support 60 according to the present disclosure. In the illustrated embodiment, lid support 60 is shown as a separate component unattached to either food grade tray 20 or lid 30, but could be attached to either one without departing from the present disclosure. In addition, the illustrated embodiment shows only a single lid support 60, but depending upon the span and rigidity of lid 30, two or more lid supports 60 might be desirable.

In the illustrated embodiment, pump 50 is shown attached to, and supported by the lid 30 outside of the evaporation chamber 40. In this embodiment, an o-ring seal 80 is in sealing contact with the lid 30 and a housing 54 of pump 50, as best shown in FIG. 3. Pump 50 may be attached to lid 30 with a fastener 70 that has a portion 71 positioned in the evaporation chamber 40, and another portion 72 positioned within the housing 54 of pump 50. Fastener 70 may be surrounded by o-ring seal 80 and extend through a plane defined by the o-ring 80. The lid 30 may define at least one through hole 33 that is located between o-ring 80 and the fastener 70. The housing 54 of pump 50 defines at least one through hole 55 located between the o-ring seal 80 and fastener 70. Thus, the through holes 33 and 55 fluidly connect the evaporation chamber 40 to an interior 56 of the housing 54 of pump 50. The fastener 70 may be bolt 73 with a head 74 located in the housing 54 of pump 50. A first nut 75 may be mated to bolt 73 and located between the housing 54 and the lid 30, and a second nut 76 positioned inside the evaporation chamber 40. Electric gaseous fluid pump 50 may be an aquarium air pump and include at least one oscillating electromagnetic coil 57. Thus, pump 50 may be powered through connection to a conventional AC wall outlet well known in the art.

Food grade tubing 90 is preferably transparent so that movement of condensed solvent can be observed when in the configuration shown in FIG. 2, with a majority of the length 93 of the food grade tubing 90 positioned in freezer 15 when the plant essential oil extractor 10 is in the second configuration 12. The remote opposite end 92 of food grade tubing may be positioned in a solvent collection container, such as a bottle, where the condensed solvent liquid 9 will collect during operation of the device. If not all of the evaporated solvent 8 is condensed in tube 90 during operation, one could expect to observe solvent vapor bubbles 98 being pushed into solvent collection container 99 when pump 50 is in operation.

The evaporation rate of solvent in evaporation chamber 40 may be enhanced by supporting the food grade tray 20 on an electric heating mat 100 as shown in FIG. 2. Electric heating mat 100 may produce output temperatures in the range of 90-105°. Higher temperature range heaters could be utilized, but possibly at the expense of evaporating and losing volatile components of the plant essential oil that are intended to remain in the evaporation chamber 40. Also, the device will work at room temperatures, but take longer as the evaporation rate of the solvent is proportional to the surface temperature inside evaporation chamber 40. In any event, the electric heating mat 100 should have a maximum operating temperature that is less than a boiling point of the solvent, which is preferably food grade ethanol. Those skilled in the art will appreciate that when pump 50 draws a vacuum in evaporation chamber 40, the boiling point of the solvent is reduced accordingly. Thus, this disclosure teaches away from boiling off solvent in order to separate the same from the dissolved plant essential oil, as is sometimes taught in the art. The lower temperature and encouraged evaporation strategy of the present disclosure is believed to preserve more valuable and desirable terpenes in the plant essential oil.

In order to provide a relatively large surface area for an increased evaporation rate, food grade tray 20 preferably has a length dimension 17 that is greater than or equal to a width dimension 18 that is greater than a height dimension 19. Nevertheless, those skilled in the art will appreciate that other dimensional relationships could also work, but could slow the evaporation extraction process accordingly.

Figure 4:
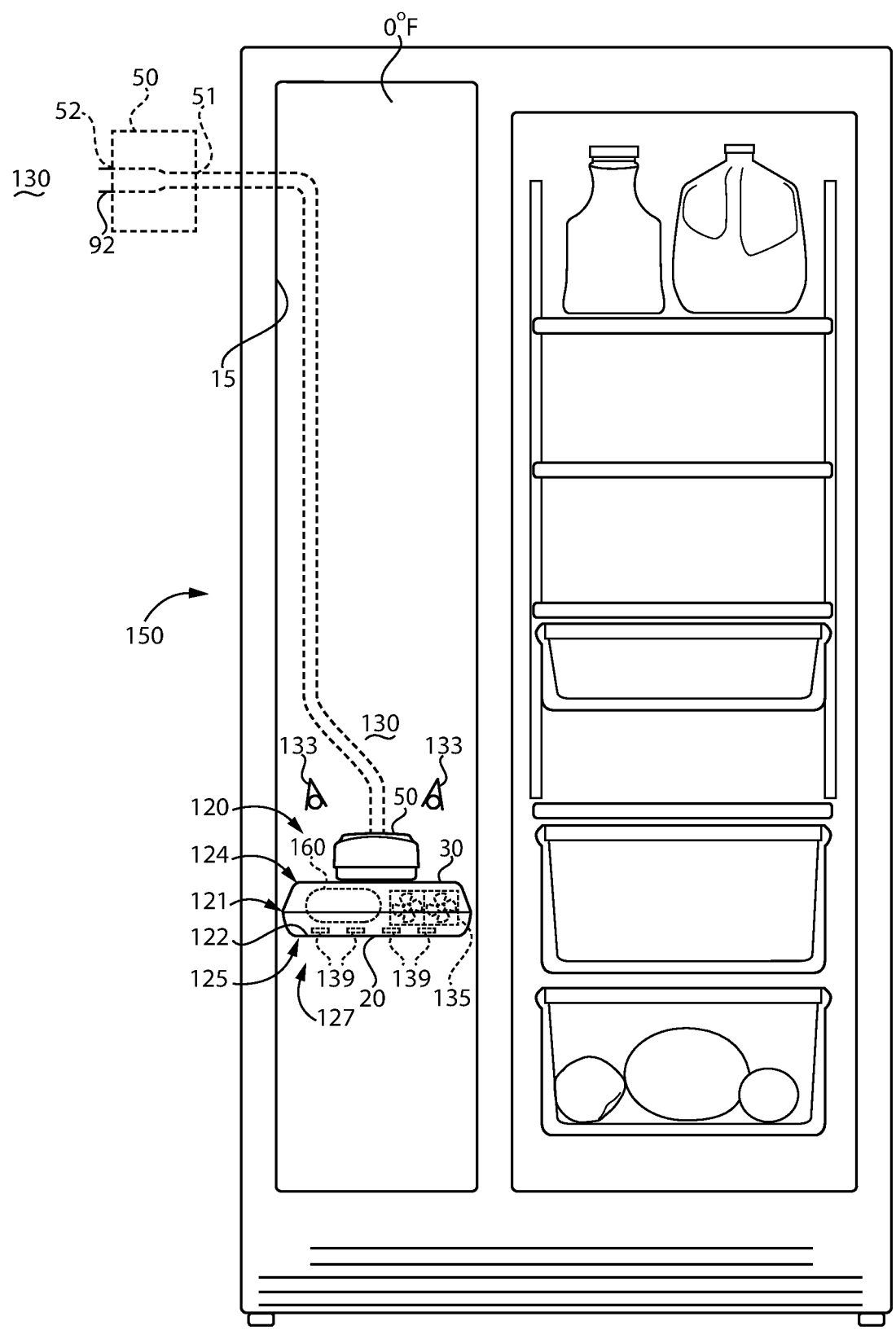
FIG. 4 is a side schematic view of the apparatus of FIG. 1 configured as a vacuum sublimation freeze drying apparatus according to another aspect of the present disclosure.

Referring now to FIG. 4, the device shown in FIG. 1 can be repurposed and reconfigured as a vacuum sublimation freeze drying apparatus 120 that includes freezer 15. In this application, and referring also back to FIG. 1, a container 121 includes a first component 124 that is movable with respect to a second component 125 between and open configuration 126 as shown in FIG. 1 and a closed configuration 127 as shown in FIG. 4. Although the first component 124 and second component 125 could be the tray 20 and lid 30 associated with the plant essential oil extractor 10 described earlier, this need not be the case, as the shape of a drying chamber 122 defined by container 121 need not have a specific shape that produces a large surface area to encourage evaporation. Instead, the drying chamber should be adequately sized to hold a desired amount of fresh or partially dried plant material that is undergoing a sublimation freeze drying process. An electric gaseous fluid pump 50 has an inlet 51 (FIG. 3) fluidly connected to the drying chamber 122 and an outlet 52 that opens to an area 130 outside of the container 121. When used as a vacuum sublimation freeze drying apparatus 120, the food grade tubing 90 may not be needed so that the area 130 outside of container 121 may be interior of freezer 15, or may be a location 130 outside of freezer 15 as shown in dotted lines in FIG. 4. Although the gaseous fluid pump 50 is shown attached to container 121, this need not necessarily be the case. Thus, FIG. 4 shows in dotted lines a possible configuration in which a pump 50 is positioned outside of freezer 15 and utilizes a length of conduit, such as food grade tubing 90 to connect an inlet 51 of the pump to the drying chamber 122 without departing from this embodiment of the present disclosure.

Figure 5:
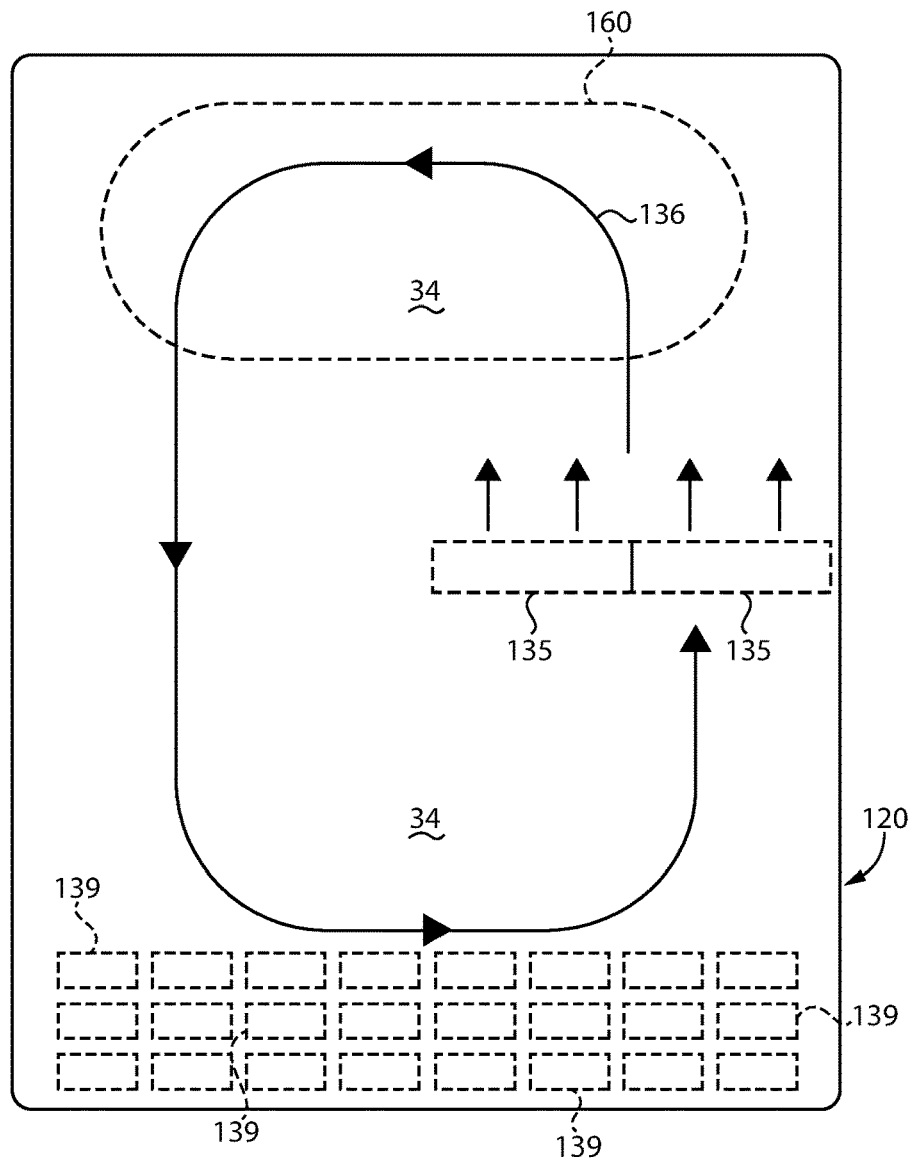
FIG. 5 is a top schematic view of the freeze drying apparatus of FIG. 4 showing an air circulation pattern.
Figure 6:
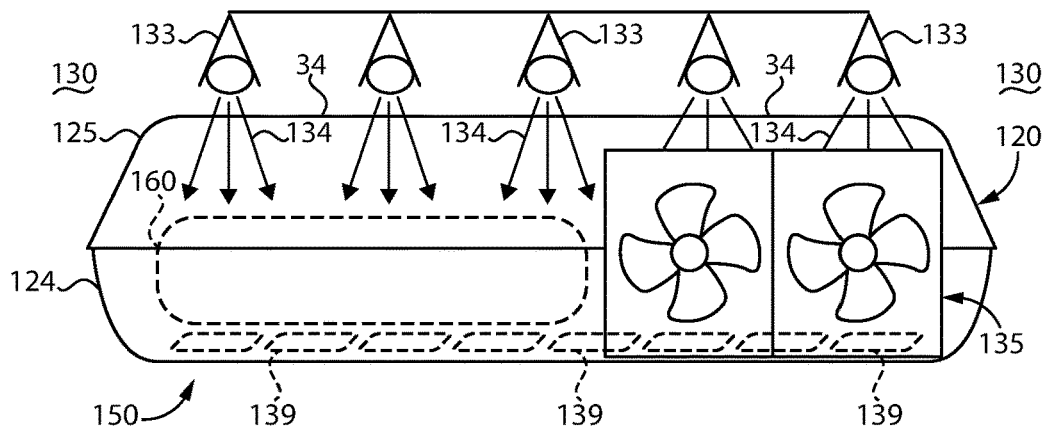
FIG. 6 is a side schematic view of a freeze drying apparatus with the pump omitted for clarity.

Referring in addition to FIGS. 5 and 6, in order to better simulate conditions that promote sublimation, such as those often found on mountain tops, the freeze drying apparatus may also include a light source 133 that is operably positioned to project light 134, which may simulate sunlight, into the drying chamber 122. In addition, an air circulation fan 135 may be positioned in the drying chamber and oriented to define an air circulation pattern 136 within the drying chamber 122. Also, a desiccant such as silica gel packets 139 or maybe even rice may be positioned in drying chamber 122 to reduce a humidity level to promote sublimation. These aspects of the freeze drying apparatus are shown in FIGS. 5 and 6. Preferably, the light source 133 is positioned outside the container 120, but could be positioned within the container 121 without departing from the present disclosure. When positioned outside of the container 121, the container should include a window 34 that is transparent to light 134 so that the water ice in herbs 160 can absorb the energy necessary for sublimation to occur. The air circulation fan 135 acts to simulate windy conditions by continuously moving dry air over the herbs 160 positioned in the drying chamber 122. Finally, a desiccant, such as silica gel packets 139, are positioned in the drying chamber to reduce the humidity level of the air in drying chamber 122. Thus, the vacuum pump 50 creates a vacuum that reduces pressure in drying chamber 122 to simulate lower pressures encountered near mountain tops. The desiccant is included to reduce humidity levels for the air positioned in drying chamber 22. The air circulation fan 135 and the light source 133 add to the energy necessary to promote sublimation of water ice molecules from the herbs 160 positioned in drying chamber 122 to water vapor, and simulate sunshine and wind typically encountered on mountain tops where sublimation tends to occur. Finally, in order to further promote sublimation, the herbs should be spaced and left in an uncrushed configuration so that surface area is maximized and air can freely circulate throughout the herbs during the freeze drying process. The desiccant may serve to reduce humidity in the drying chamber while the pump reduces pressure under a vapor pressure of the water ice. The fan and light add energy to the surface of ice crystals to aid in their escape from the surface into vapor.

The freeze drying apparatus 120 has a first configuration 140 as shown in FIG. 1 and characterized by the container 121 being out of contact with freezer 15 and in an open configuration 126, with the electric gaseous fluid pump 50 turned off. The fan 135 and the light source 133, if included, are also turned off. The freeze drying apparatus 120 also has a second configuration 150 as shown in FIG. 4 characterized by the container 121 being positioned inside, and in contact with, the freezer 15 while in the closed configuration 127, with the electric gaseous fluid pump 50 turned on. The fan 135 and light source 133, if included, are turned on. The desiccant 139 may also be positioned in drying chamber 122. The freeze drying process may typically take one to several days to complete.

As discussed earlier, electric gaseous fluid pump 50 may include a pump housing 54 attached directly to the container 121, as shown for example in FIG. 3. However, the pump may be disconnected from the container 121 and only have a fluid connection without any housing connection as shown in the dotted lines of FIG. 4. Thus, the dotted lines of FIG. 4 show the fluid pump 50 positioned outside the freezer 15 when the freeze drying apparatus 120 is in the second configuration 150. In this specific example, the freeze drying apparatus is essentially a repurposing of the plant essential oil extractor 10 discussed earlier in that the first component 124 is a tray 20, and the second component 125 is a lid 30 that contacts the tray 20 at an annular contact 128. Depending upon the magnitude of the vacuum drawn by pump 50, a lid support 60, such as that discussed earlier may be compressed between the tray 20 and the lid 30 away from the annular contact 128 responsive to operation of the electric gaseous fluid pump 50. Finally, a quantity of live herbs 160 may be positioned in the container 121 when the freeze drying apparatus 120 is in the second configuration 150. The present disclosure contemplates fresh cuttings going directly into the freeze drying apparatus 120 for processing without any pre-drying or other curing done to the freshly cut herbs 160.

The base surface 22 preferably has a surface area of at least 200 square inches, which may correspond to the size of a standard half baking sheet. Although not necessary, a liner 110 may be included in contact with the base surface 22 and positioned inside the evaporation chamber 40. Thus, the liner 110 may have upturned sides 111 to contain a liquid from contact with the base surface 22 and act as a collection surface for the herb essential oil after all solvent has been evaporated off and may better facilitate collection of the essential oil. For instance, the liner may be parchment paper or maybe even cling wrap or another suitable food grade material that can be separated from tray 20 to better facilitate collection of the residual herb essential oil left thereon after the extractor 10 has completed its processing. For instance, the essential oil may be so viscous at room temperatures as being difficult to scrape off of the tray 20. This problem can be dealt with either by briefly positioning the tray in a low temperature oven, such as at 200° F. to make the essential oil less viscous for scraping off of base surface 22. Alternatively, the liner with the herb essential oil stuck thereto may be briefly placed in a freezer to make the essential oil so brittle as to be easily separated from the liner 110. Preferably, a temperature differential between the evaporation chamber 40 and the freezer 15 will be in the range of 80-120° F. A length of kitchen cling wrap may serve as both the liner 110 and as a food grade seal 46 that is in contact with both the tray 20 and the lid 30 as discussed earlier.

INDUSTRIAL APPLICABILITY

The present disclosure finds general applicability to processing herb essential oils, especially in a home environment with the assistance of a conventional freezer. Nevertheless, the teachings of the present disclosure could be scaled for larger operations. One contemplated application could be freeze drying fresh herb 160 in a vacuum sublimation process using freeze drying apparatus 120. Thereafter, the freeze dried herbs could be pulverized or ground and used in a dried herb vaporizer or be immersed in a solvent to dissolve the contained essential oils in the solvent. Thereafter, the plant material could be filtered away from the combined solvent and dissolved essential oil. Thereafter, a solvent with dissolved essential oil could be processed to separate this solvent from the essential oil using the plant essential oil extractor 10 previously described.

Referring again to FIGS. 1-3, a method of operating a herb essential oil extractor 10 includes positioning a solvent with dissolved plant essential oil 7 onto the food grade tray 20. The lid 30 is attached to the food grade tray to define the evaporation chamber 40 so that the solvent and the dissolved herb essential oil 7 are visible through a window 34 that is part of one of the food grade tray 20 and the lid 30. As shown in FIG. 3, evaporated solvent 8 is moved out of the evaporation chamber 40 with the electric gaseous fluid pump 50. The electric gaseous fluid pump 50 reduces pressure in the evaporation chamber 40 below am ambient pressure $P_A$ outside of the evaporation chamber 40 to hasten the evaporation process. The evaporated solvent 8 is moved into one end 91 of food grade tubing 90 that is fluidly connected to the outlet 52 of the electric gaseous fluid pump 50. The evaporated solvent 8 is condensed back to a liquid 9 responsive to positioning the opposite end 92 of the food grade tubing 90 in freezer 15. The evaporation rate of the solvent in the evaporation chamber 40 may be increased responsive to contact between food grade tray 20 and an electric heating mat 100 as shown in FIGS. 2 and 3. A lid support 60 may be compressed between the base surface 22 and an inside surface 32 of the lid 30 responsive to a pressure drop in the evaporation chamber relative to ambient pressure piece of A. The evaporation process may typically take 12-48 hours.

By allowing the pump 50 to be oversized relative to the condensation tubing 90 such that only a majority but not all of the solvent vapor is condensed into tubing 90, the pump 50 can be relied upon to push the condensed liquid into a suitable collection container 99 without relying upon gravity. The illustrated embodiment shows that the tube enters freezer 15 at a high point and gradually moves downward relative to gravity before the remote end 92 opens into a collection container. But this need not be the case when relying upon 50 to push liquid through tubing 90 and accepting the collection of only a majority of the dissolved solvent during the process. After the evaporation separation process is completed, the plant essential oil may be scraped off of base surface 22 and stored in a separate container, such as a small jar.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A plant oil extractor comprising:
 a food grade tray with a perimeter wall separating a base surface from a rim;
 a removable lid with a rim contact surface shaped and sized to mate with the rim;
 wherein the tray and the lid define an evaporation chamber when the lid is mated to the tray, and at least one of the tray and the lid including a transparent window positioned to allow the base surface to be seen from outside of the evaporation chamber;
 an electric gaseous fluid pump with an inlet fluidly connected to the evaporation chamber and an outlet fluidly connected to an area outside of the evaporation chamber; and
 wherein the extractor has a first configuration in which the pump is off and the lid is out of contact with the tray, and a second configuration in which the rim contact surface of the lid is mated to the rim of the tray, the pump is on, and a pressure inside the evaporation chamber is lower than a pressure outside the evaporation chamber, and a third configuration in which the lid is mated to the tray, and both the tray and lid are tilted together.

2. The plant oil extractor of claim 1 including a lid support compressed between the base surface and an inside surface of the lid when the extractor is in the second configuration.

3. The plant oil extractor of claim 1 wherein the pump is attached to, and supported by, the lid outside of the evaporation chamber.

4. The plant oil extractor of claim 1 including an o-ring seal in sealing contact with the lid and the housing of the pump.

5. The plant oil extractor of claim 1 including food grade tubing at least 15 feet long with one end attached to, and in fluid communication with, the outlet of the pump.

6. The plant oil extractor of claim 5 wherein a majority of a length of the food grade tubing is positioned in a freezer when the plant oil extractor is in the second configuration.

7. The plant oil extractor of claim 6 wherein an opposite end of the food grade tubing is positioned in a freezer.

8. The plant oil extractor of claim 1 wherein the food grade tray is rigid metal or glass, and the lid is flexible plastic.

9. The plant oil extractor of claim 1 including an electric heating mat supporting the food grade tray; and
 the electric heating mat has a maximum operating temperature that is less than a boiling point of ethanol in the evaporation chamber.

10. The plant oil extractor of claim 1 wherein the electric gaseous fluid pump includes at least one oscillating electromagnetic coil.

11. The plant oil extractor of claim 1 including a food grade seal in contact with the tray and the lid.

12. The plant oil extractor of claim 1 wherein the evaporation chamber has a length dimension greater than or equal to a width dimension that is greater than a height dimension.

13. A method of operating a plant oil extractor comprising the steps of:

positioning a solvent with dissolved plant oil onto a food grade tray;

attaching a lid to the food grade tray to define an evaporation chamber so that the solvent and dissolved plant oil are visible through a window that is part of one of the food grade tray and the lid;

moving evaporated solvent out of the evaporation chamber with an electric gaseous fluid pump, and the electric gaseous fluid pump reduces pressure in the evaporation chamber to below an ambient pressure outside of the evaporation chamber;

moving the evaporated solvent into one end of food grade tubing fluidly connected to an outlet of the electric gaseous fluid pump; and condensing the evaporated solvent back to a liquid responsive to positioning an opposite end of the food grade tubing in a freezer.

14. The method of claim 13 including increasing an evaporation rate of the solvent in the evaporation chamber responsive to contact between the food grade tray and an electric heating mat; and compressing a lid support between a base surface of the food grade tray and an inner surface of the lid responsive to a pressure drop in the evaporation chamber relative to the ambient pressure.

15. A vacuum sublimation freeze drying apparatus comprising:

a freezer;

a container defining a drying chamber and including a first component moveable with respect to a second component between an open configuration and a closed configuration;

an electric gaseous fluid pump with an inlet fluidly connected to the drying chamber, and an outlet that opens to an area outside of the container;

a desiccant positioned in the drying chamber;

wherein, with an exception of the inlet of the electric gaseous fluid pump, the drying chamber is a closed volume in the closed configuration;

wherein the freeze drying apparatus has a first configuration characterized by the container being out of contact with the freezer in an open configuration and the electric gaseous fluid pump is turned off, and a second configuration characterized by the container being positioned inside, and in contact with, the freezer in the closed configuration and the electric gaseous fluid pump is turned on, and desiccant is positioned in the drying chamber.

16. The freeze drying apparatus of claim 15 including an air circulation fan positioned in the drying chamber and oriented to define any air circulation pattern within the drying chamber.

17. The freeze drying apparatus of claim 15 including a light source operably positioned to project light in the drying chamber.

18. The freeze drying apparatus of claim 15 wherein the electric gaseous fluid pump is positioned outside of the freezer when the freeze drying apparatus is in the second configuration.

19. The freeze drying apparatus of claim 15 wherein the first component is a tray, and the second component is a lid contacting the tray at an annular contact;

a lid support compressed between the tray and lid away from the annular contact responsive to operation of the electric gaseous fluid pump.

20. The freeze drying apparatus of claim 15 including a quantity of live herbs positioned in the container when the freeze drying apparatus is in the second configuration.

* * * * *